(12) United States Patent
Chen et al.

(10) Patent No.: US 12,317,115 B2
(45) Date of Patent: *May 27, 2025

(54) MEASUREMENT GAP CONFIGURATION METHOD, NODE AND USER EQUIPMENT

(71) Applicant: VIVO MOBILE COMMUNICATION CO., LTD., Guangdong (CN)

(72) Inventors: Li Chen, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,215

(22) Filed: Jan. 16, 2024

(65) Prior Publication Data
US 2024/0155396 A1    May 9, 2024

Related U.S. Application Data

(63) Continuation of application No. 17/523,255, filed on Nov. 10, 2021, now Pat. No. 11,917,443, which is a continuation of application No. 16/610,792, filed as application No. PCT/CN2018/085448 on May 3, 2018, now Pat. No. 11,523,294.

(30) Foreign Application Priority Data

May 5, 2017    (CN) .......................... 201710313283.9

(51) Int. Cl.
H04W 24/10    (2009.01)

(52) U.S. Cl.
CPC .................................. *H04W 24/10* (2013.01)

(58) Field of Classification Search
CPC ..................................................... H04W 24/10
See application file for complete search history.

(56) References Cited

U.S. PATENT DOCUMENTS

| 2011/0274007 A1 | 11/2011 | Lin et al. |
| 2014/0341192 A1 | 11/2014 | Venkob et al. |

(Continued)

FOREIGN PATENT DOCUMENTS

| CN | 102325334 A | 1/2012 |
| CN | 106304128 A | 1/2017 |

(Continued)

OTHER PUBLICATIONS

Chinese Office Action dated May 21, 2019 as received in application No. 201710313283.9.

(Continued)

*Primary Examiner* — Abdeltif Ajid
(74) *Attorney, Agent, or Firm* — BROOKS KUSHMAN P.C.

(57) ABSTRACT

The present disclosure relates to the field of communication technology, and provides a measurement gap configuration method, a node and a UE. The measurement gap configuration method for a first node includes configuring a measurement gap for a UE. The measurement gap includes at least one of a per-UE measurement gap for the UE, a per-CG measurement gap for each cell group corresponding to the UE, or a per-CC measurement gap for a component carrier corresponding to the UE.

20 Claims, 3 Drawing Sheets

(56) References Cited

U.S. PATENT DOCUMENTS

| | | | |
|---|---|---|---|
| 2015/0124728 A1 | 5/2015 | Bergstrom et al. | |
| 2015/0327322 A1* | 11/2015 | Huang | H04W 24/10 |
| | | | 370/329 |
| 2016/0295583 A1 | 10/2016 | Kazmi et al. | |
| 2017/0026924 A1 | 1/2017 | Gou et al. | |
| 2017/0134976 A1* | 5/2017 | Uchino | H04W 36/0088 |
| 2018/0006774 A1* | 1/2018 | Yiu | H04L 5/0091 |
| 2019/0075585 A1 | 3/2019 | Deogun et al. | |
| 2020/0344633 A1 | 10/2020 | Zhang et al. | |

FOREIGN PATENT DOCUMENTS

| | | | |
|---|---|---|---|
| CN | 106559826 A | 4/2017 | |
| WO | 2011096577 A1 | 8/2011 | |
| WO | 2016022196 A | 2/2016 | |
| WO | 2016074883 A | 5/2016 | |
| WO | 2016182527 A | 11/2016 | |

OTHER PUBLICATIONS

European Search Report dated Mar. 24, 2020 as received in application No. 18794465.7.

"Measurement gap configuration in Dual Connectivity" 3GPP TSG-RAN WG2 #85bis, R2-141236. Mar. 21, 2014. NTT Docomo, Inc.

"Measurement gap configuration in Dual Connectivity" 3GPP TSG-RAN WG2 meeting #86, R2-142517. May 19, 2014, Qualcomm Incorporated.

"Discussion on measurement gap" 3GPP TSG-TRAN WG2 Meeting #99bis, R21-710929, Oct. 9, 2017, VIVO.

"Discussion on RRM measurement gap in DC scenario" 3GPP TSG-RAN WG4 Meeting #71AH, R4-71AH-0005, Jun. 24, 2014, Huawei.

Written Opinion and International Search Report dated Nov. 14, 2019 as received in application No. PCT/CN2018/085448.

Non-final Office Action dated Mar. 2, 2021 as received in U.S. Appl. No. 16/610,792.

Office Action issued in corresponding U.S. Appl. No. 16/610,792, dated Jun. 10, 2022.

* cited by examiner

MEASUREMENT GAP CONFIGURATION METHOD, NODE AND USER EQUIPMENT

CROSS-REFERENCE TO RELATED APPLICATION

The present application claims the benefit of and is a continuation application of U.S. patent application Ser. No. 17/523,255 filed on Nov. 10, 2021. U.S. patent application Ser. No. 17/523,255 claims the benefit of and is a continuation application of U.S. patent application Ser. No. 16/610,792 filed on Nov. 4, 2019, which is the U.S. national phase of PCT Application No. PCT/CN2018/085448 filed on May 3, 2018, and claims a priority of the Chinese patent application No. 201710313283.9 filed on May 5, 2017. Each of the above-listed applications incorporated herein by reference in its entirety.

TECHNICAL FIELD

The present disclosure relates to the field of communication technology, in particular to a measurement gap configuration method, a node and a User Equipment (UE).

BACKGROUND

Intra-frequency measurement and inter-frequency measurement are involved in Technical Specification (TS) 36.300. The intra-frequency measurement refers to a situation in which a cell where a UE is currently located and a to-be-measured target cell are on a same carrier frequency (a central frequency). The inter-frequency measurement refers to a situation in which the cell the UE is currently located and the to-be-measured target cell are not on a same carrier frequency.

When the UE needs to perform the inter-frequency measurement (including inter-Radio Access Technology (RAT) measurement), as a simple way, two types of radio frequency (RF) receivers are installed in the UE, so as to measure a frequency for a current cell and a frequency for the target cell. However, this leads to an increase in the cost and interference between different frequencies. Hence, measurement gap (MG) has been presented by the $3^{rd}$-Generation Partnership Project (3GPP), i.e., during the normal transmission and reception of data, a certain time period (i.e., a measurement gap time) is reserved, and within this time period, the UE may not transmit and receive any data. Each receiver is tuned to the frequency for the target cell for the inter-frequency (or inter-RAT) measurement. After the end of the measurement gap time, the receiver is tuned back to the frequency for the current serving cell for the continuous transmission and reception of data.

In a scenario in which the cell where the UE is currently located has a carrier frequency different from the target cell and a bandwidth of the target cell is smaller than, and located within, a bandwidth of the current cell, the inter-frequency measurement needs to be performed and the measurement gap needs to be provided.

In a scenario in which the cell where the UE is currently located has a carrier frequency different from the target cell, the bandwidth of the target cell is greater than the bandwidth of the current cell and the bandwidth of the current cell is located within the bandwidth of the target cell, the inter-frequency measurement needs to be performed and the measurement gap needs to be measured.

In a scenario in which the cell where the UE is currently located has a carrier frequency different from the target cell and the bandwidth of the target cell does not overlap the bandwidth of the current cell, the inter-frequency measurement needs to be performed and the measurement gap needs to be measured.

In order to enable the UE to determine when to perform the inter-frequency measurement or the transmission and reception of data, the UE must understand a configuration of the measurement gap in a same manner as a network (e.g., a start position of the measurement gap, a length of the gap, and the quantity of gaps). These parameters are defined through an information element MeasGapConfig in a Radio Resource Control (RRC) configuration message or a Reconfiguration message.

The above-mentioned measurement gaps are all configured for each UE (i.e., per-UE), i.e., each UE is configured with an individual measurement gap. In Long Term Evolution (LTE)-Advanced (LTE-A), a measurement gap for each component carrier (i.e., per-CC) corresponding to the UE has been presented, i.e., each component carrier is configured with one measurement gap. For Dual Connectivity (DualCo, or DC) architecture, each cell in a Master Cell Group (MCG) (and a Slave Cell Group (SCG) belonging to a master base station (MeNB or MgNB) (and a slave base station (SeNB or SgNB)) corresponds to one component carrier. The per-CC measurement gap just refers to a situation where the individual measurement gap is configured for each component carrier.

In $5^{th}$-Generation (5G) New Radio (NR), a measurement gap for each cell group (i.e., per-CG) corresponding to the UE has also be presented. In other words, one measurement gap may be configured by the MCG and the SCG for the same UE, and this measurement gap is used by all the cells (or component carriers) belonging to the MCG (or SCG).

Granularity levels for the per-UE, per-CG and per-CC measurement gaps decrease gradually.

DC architecture will be adopted by a 5G system to increase the transmission reliability. During the deployment at a first stage, the DC architecture will be used between the 5G system and an LTE system to meet the requirement of interworking. In the DC architecture of the LTE system, the measurement gaps are configured for the UEs (per-UE), i.e., each UE is configured with one measurement gap through the MeNB.

In the discussion of a non-standalone scenario where the interworking operation performed between the 5G NR system and the LTE system, as shown in FIG. 1, at the first stage, a base station for the LTE system is mainly used as the MeNB, i.e., MN, and a base station gNB for the 5G NR system is used as the SeNB, i.e., SN.

In the current 5G NR technique, there is no scheme for coordinating the configuration of the measurement gap between the slave base stations and between the slave base station and the master base station, so it is impossible to ensure the integrity of the 5G NR communication as well as the reliability of the network communication.

SUMMARY

In one aspect, the present disclosure provides in some embodiments a measurement gap configuration method for a first node, including configuring a measurement gap for a UE. The measurement gap includes at least one of a per-UE measurement gap for the UE, a per-CG measurement gap for each cell group corresponding to the UE, or a per-CC measurement gap for a component carrier corresponding to the UE.

In another aspect, the present disclosure provides in some embodiments a measurement gap configuration method for a second node, including receiving a configuration content of a measurement gap from a first node. The measurement gap is configured by the first node for a UE, and includes at least one of a per-UE measurement gap for the UE, a per-CG measurement gap for each cell group corresponding to the UE, or a per-CC measurement gap for a component carrier corresponding to the UE.

In yet another aspect, the present disclosure provides in some embodiments a measurement gap configuration method for a UE, including receiving a measurement gap configured by a first node and/or a second node. The measurement gap includes at least one of a per-UE measurement gap for the UE, a per-CG measurement gap for each cell group corresponding to the UE, or a per-CC measurement gap for a component carrier corresponding to the UE.

In still yet another aspect, the present disclosure provides in some embodiments a first node, including a first configuration module configured to configure a measurement gap for a UE. The measurement gap includes at least one of a per-UE measurement gap for the UE, a per-CG measurement gap for each cell group corresponding to the UE, or a per-CC measurement gap for a component carrier corresponding to the UE.

In still yet another aspect, the present disclosure provides in some embodiments a second node, including a second reception module configured to receive a configuration content of a measurement gap from a first node. The measurement gap is configured by the first node for a UE, and includes at least one of a per-UE measurement gap for the UE, a per-CG measurement gap for each cell group corresponding to the UE, or a per-CC measurement gap for a component carrier corresponding to the UE.

In still yet another aspect, the present disclosure provides in some embodiments a UE, including a third reception module configured to receive a measurement gap configured by a first node and/or a second node. The measurement gap includes at least one of a per-UE measurement gap for the UE, a per-CG measurement gap for each cell group corresponding to the UE, or a per-CC measurement gap for a component carrier corresponding to the UE.

In still yet another aspect, the present disclosure provides in some embodiments a first node, including a processor, a memory, and a network access program stored in the memory and executed by the processor. The processor is configured to execute the network access program so as to implement the above-mentioned measurement gap configuration method.

In still yet another aspect, the present disclosure provides in some embodiments a second node, including a processor, a memory, and a network access program stored in the memory and executed by the processor. The processor is configured to execute the network access program so as to implement the above-mentioned measurement gap configuration method.

In still yet another aspect, the present disclosure provides in some embodiments a UE, including a processor, a memory, and a network access program stored in the memory and executed by the processor. The processor is configured to execute the network access program so as to implement the above-mentioned measurement gap configuration method.

In still yet another aspect, the present disclosure provides in some embodiments a computer-readable storage medium storing therein a network access program. The network access program is executed by a processor so as to implement the above-mentioned measurement gap configuration method.

DETAILED DESCRIPTION

In order to make the objects, the technical solutions and the advantages of the present disclosure more apparent, the present disclosure will be described hereinafter in a clear and complete manner in conjunction with the drawings and embodiments.

An object of the present disclosure is to provide a measurement gap configuration method, a node and a UE, so as to solve the problem in the related art where the network communication is incomplete and it is impossible to ensure the reliability and the validity of the network communication because there is no scheme in the 5G NR technique for coordinating the configuration of the measurement gap between the slave base stations and between the slave base station and the master base station.

Figure 1:
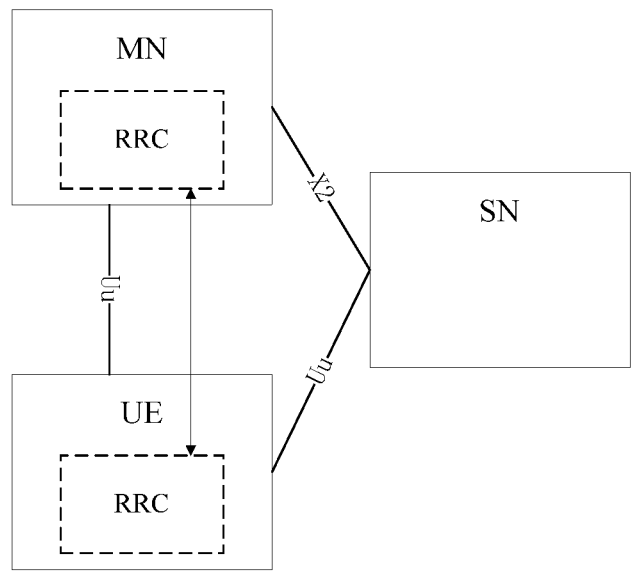
FIG. 1 is a schematic view showing a network architecture of a 5G NR system and an LTE system in a non-standalone scenario.
Figure 2:
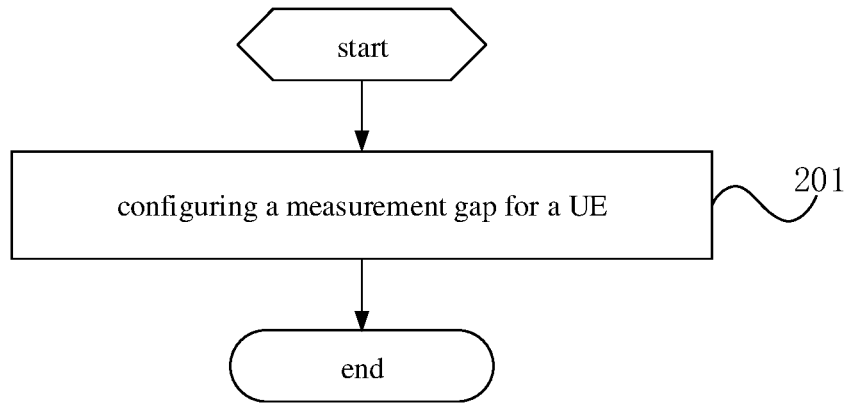
FIG. 2 is a flow chart of a measurement gap configuration method according to one embodiment of the present disclosure.

The present disclosure provides in some embodiments a measurement gap configuration method for a first node which, as shown in FIG. 2, includes Step 201 of configuring a measurement gap for a UE. The measurement gap includes at least one of a per-UE measurement gap for the UE, a per-CG measurement gap for each cell group corresponding to the UE, and a per-CC measurement gap for a component carrier corresponding to the UE.

It should be appreciated that, the measurement gap configuration method is mainly applied between a Master Node (MN) and a Slave Node (SN). Here, the node refers to a network element at an access network side, e.g., an access network node (i.e., a base station) for an LTE system, or an access network node for an NR system. The first node may be the master node or the slave node. In other words, the master node may be a node for the LTE system or the NR system, and the slave node may also be a node for the LTE system or the NR system. In a possible embodiment of the present disclosure, a combination of the master node and the slave node may include an MeNB and an SeNB, an MeNB and an SgNB, an MgNB and an SeNB, and an MgNB and an SgNB.

The measurement gap configuration method will be described hereinafter in more details.

Case 1: the measurement gap may be configured directly by the first node, and after the configuration, the first node may transmit a configuration content of the measurement gap to a second node.

In a possible embodiment of the present disclosure, the configuration content of the measurement gap may be transmitted to the second node via an X2 interface, or an S1 interface for Operation, Administration and Maintenance (OAM) architecture, or the configuration content of the measurement gap may be transmitted to the UE so that the UE may report the configuration content of the measurement gap to the second node.

In this case, the measurement gap may be configured by the first node. The first node may merely configure the measurement gap related to the first node, or may configure the measurement gap related to the second node. Hence, the configuration content of the measurement gap may include at least one of a configuration content of the per-UE measurement gap for the UE, a configuration content of the measurement gap corresponding to the first node, and a configuration content of the measurement gap corresponding to the second node.

The configuration content of the measurement gap corresponding to the first node may include at least one of a configuration content of the per-CG measurement gap for each cell group corresponding to the UE and a configuration content of the per-CC measurement gap for a component carrier corresponding to the UE.

The configuration content of the measurement gap corresponding to the second node may include at least one of a configuration content of the per-CG measurement gap for each cell group corresponding to the UE and a configuration content of the per-CC measurement gap for a component carrier corresponding to the UE.

It should be appreciated that, when the first node merely configures the measurement gap related to the first node itself, in order to acquire the measurement gap related to the second node, the measurement gap configuration method may further include receiving a configuration content of a measurement gap from the second node. In other words, the first node and the second node may configure the measurement gaps independently, and after the configuration, each of the first node and the second node may receive the configuration content of the measurement gap from the other.

In a possible embodiment of the present disclosure, the first node may receive the configuration content of the measurement gap from the second node via the X2 interface or the S1 interface for the OAM architecture, or receive from the second node the configuration content of the measurement gap forwarded by the UE.

Case 2: the first node and the second node may coordinate the configuration of the measurement gap.

Prior to Step 201, the measurement gap configuration method may further include acquiring request information about the measurement gap from the second node. The request information may include at least one of a configuration request and a configuration policy.

It should be appreciated that, the configuration request refers to a request for configuring the measurement gap. Upon the receipt of the configuration request, the first node may determine that it is necessary to configure the measurement gap for the UE. The configuration policy refers to a configuration content to be configured by the second node. The second node may configure the measurement gap in advance, and then transmit the configured the measurement gap to the first node so that the first node may determine whether the measurement gap is capable of being configured in this way.

It should be further appreciated that, the request information about the measurement gap may be transmitted by the second node to the first node. In a scenario, the second node does not configure the measurement gap at the beginning. When the second node needs to configure the measurement gap (i.e., the UE has transmitted the request for configuring the measurement gap to the second node), the second node needs to transmit the request information to the first node, so as to request the first node to configure the measurement gap.

To be specific, the first node may receive the request information about the measurement gap from the second node via the X2 interface or the S1 interface of the OAM architecture, or receive the request information about the measurement gap forwarded by the UE.

When the request information received by the first node is the configuration request, the following processings may be performed.

1. The first node may configure the measurement gap for the UE in accordance with the request information. The measurement gap may include at least one of a per-UE measurement gap for the UE, a measurement gap corresponding to the first node and a measurement gap corresponding to the second node.

After the configuration, the first node may perform the following processings. The first node may directly transmit the configured measurement gap to the UE rather than to the second node. In addition, the first node may transmit the configured measurement gap to the UE and meanwhile transmit the configuration content of the configured measurement gap to the second node.

It should be appreciated that, the configuration content of the measurement gap may be transmitted by the first node to the second node via the X2 interface or the S1 interface for the OAM architecture, or the configuration content of the measurement gap may be forwarded by the UE to the second node.

When the measurement gap is the per-UE measurement gap, the first node may directly configure one per-UE measurement gap for the UE. When the measurement gap is the per-CG measurement gap, the first node may configure the per-CG measurement gaps corresponding to the first node and the second node. When the measurement gap is the per-CC measurement gap, the first node may configure the measurement gaps for all the CCs corresponding to the first node and the second node.

2. The first node may determine the configuration content of the measurement gap corresponding to the second node in accordance with the request information.

Here, the first node may determine how the measurement gap needs to be configured by the second node at first, and notify the second node of the configuration content of the measurement gap, so that the second node may configure the measurement gap for the UE. In addition, the first node may also configure the measurement gap corresponding to the first node itself for the UE.

When the measurement gap is the per-CG measurement gap, the first node may configure the per-CG measurement gap corresponding to the first node, and the second node may configure the per-CG measurement gap corresponding to the second node. When the measurement gap is the per-CC measurement gap, the first node may configure the measurement gaps for all the CCs corresponding to the first node, and the second node may configure the measurement gaps for all the CCs corresponding to the second node.

3. The first node may determine the configuration contents of the measurement gaps corresponding to the first node and the second node in accordance with the request information.

Here, the first node may determine how the measurement gaps needs to be configured by the first node and the second node at first, and notify the second node of the configuration content of the measurement gap. Then, the second node may configure the measurement gap for the UE.

When the measurement gap is the per-UE measurement gap, the second node may directly configure one per-UE measurement gap for the UE. When the measurement gap is the per-CG measurement gap, the second node may configure the per-CG measurement gaps corresponding to the first node and the second node. When the measurement gap is the per-CC measurement gap, the second node may configure the measurement gaps for all the CCs corresponding to the first node and the second node.

When the request information received by the first node is the configuration policy, the first node needs to make a decision at first. When making the decision, the first node may select a to-be-used measurement gap in accordance with a minimum UE capability. In addition, when the measurement gap is the per-CG measurement gap, the per-CG measurement gap corresponding to the first node may be configured in accordance with first node, and the per-CG measurement gap corresponding to the second node may be configured in accordance with the second node. When the measurement gap is the per-CC measurement gap, the measurement gaps for all the CCs corresponding to the first node may be configured in accordance with the first node, and the measurement gaps for all the CCs corresponding to the second node may be configured in accordance with the second node.

After the decision has been made, the first node may perform the following processings.

1. The first node may configure the measurement gap for the UE. Here, the first node may directly configure the measurement gap for the UE, and it is unnecessary for the second node configure the measurement gap.

After the configuration, the first node may perform the following processings. The first node may directly transmit the configured measurement gap to the UE rather than to the second node. In addition, the first node may transmit the configured measurement gap to the UE and meanwhile transmit the configuration content of the configured measurement gap to the second node.

It should be appreciated that, the configuration content of the measurement gap may be transmitted by the first node to the second node via the X2 interface or the S1 interface for the OAM architecture, or the configuration content of the measurement gap may be forwarded by the UE to the second node.

When the measurement gap is the per-UE measurement gap, the first node may directly configure one per-UE measurement gap for the UE. When the measurement gap is the per-CG measurement gap, the first node may configure the per-CG measurement gaps corresponding to the first node and the second node. When the measurement gap is the per-CC measurement gap, the first node may configure the measurement gaps for all the CCs corresponding to the first node and the second node.

2. The first node may transmit all the configuration contents to the second node, and the second node may configure the measurement gap for the UE.

When the measurement gap is the per-UE measurement gap, the second node may directly configure one per-UE measurement gap for the UE. When the measurement gap is the per-CG measurement gap, the second node may configure the per-CG measurement gaps corresponding to the first node and the second node. When the measurement gap is the per-CC measurement gap, the second node may configure the measurement gaps for all the CCs corresponding to the first node and the second node.

3. The first node may transmit the configuration content corresponding to the second node to the second node, and the first node and the second node may configure the measurement gaps for the UE respectively.

When the measurement gap is the per-CG measurement gap, the first node may configure the per-CG measurement gap corresponding to the first node, and the second node may configure the per-CG measurement gap corresponding to the second node. When the measurement gap is the per-CC measurement gap, the first node may configure the measurement gaps for all the CCs corresponding to the first node, and the second node may configure the measurement gaps for all the CCs corresponding to the second node.

Case 3: a central control node may make a decision on the configuration content.

To be specific, the first node may transmit the configuration policy of the measurement gap to the central control node. The central control node may determine the configuration content of the measurement gap in accordance with the configuration policy. Then, the first node may receive the configuration content from the central control node.

It should be appreciated that, the central control node may be a network element of a core network or an access network. In a possible embodiment of the present disclosure, the central control node may be a network element of the core network.

When making the decision, the central control node may select a to-be-used measurement gap in accordance with the minimum UE capability. In addition, when the measurement gap is the per-CG measurement gap, the central control node may configure the per-CG measurement gap corresponding to the first node in accordance with the first node, and configure the per-CG measurement gap corresponding to the second node in accordance with the second node. When the measurement gap is the per-CC measurement gap, the central control node may configure the measurement gaps for all the CCs corresponding to the first node in accordance with the first node, and configure the measurement gaps for all the CCs corresponding to the second node in accordance with the second node.

After the decision has been made, the central control node may perform the following processings.

1. The central control node may transmit the configuration content of the measurement gap determined in accordance with the configuration policy to the first node, and the first node may configure the measurement gap for the UE.

To be specific, when the measurement gap is the per-UE measurement gap, the first node may directly configure one per-UE measurement gap for the UE. When the measurement gap is the per-CG measurement gap, the first node may configure the per-CG measurement gaps corresponding to the first node and the second node. When the measurement gap is the per-CC measurement gap, the first node may configure the measurement gaps for all the CCs corresponding to the first node and the second node.

2. The central control node may transmit the configuration content of the measurement gap determined in accordance with the configuration policy to the second node, and the second node may configure the measurement gap for the UE.

To be specific, when the measurement gap is the per-UE measurement gap, the second node may directly configure one per-UE measurement gap for the UE. When the measurement gap is the per-CG measurement gap, the second node may configure the per-CG measurement gaps corresponding to the first node and the second node. When the measurement gap is the per-CC measurement gap, the second node may configure the measurement gaps for all the CCs corresponding to the first node and the second node.

3. The central control node may transmit the configuration content of the measurement gap determined in accordance with the configuration policy to the first node and the second node, and the first node and the second node may configure the measurement gaps for the UE respectively.

To be specific, when the measurement gap is the per-CG measurement gap, the first node may configure the per-CG measurement gap corresponding to the first node, and the second node may configure the per-CG measurement gap corresponding to the second node. When the measurement gap is the per-CC measurement gap, the first node may configure the measurement gaps for all the CCs corresponding to the first node, and the second node may configure the measurement gaps for all the CCs corresponding to the second node.

Case 4: the measurement gap may be configured in accordance with a request from the UE.

The first node may acquire measurement gap configuration-related information reported by the UE or transmitted by the second node, and then configure the measurement gap for the UE in accordance with the measurement gap configuration-related information. The measurement gap configuration-related information may include a measurement gap required by the UE and/or a measurement gap supported by the UE capability.

It should be appreciated that, the UE may report the measurement gap configuration-related information as follows.

1. The UE may report the measurement gap configuration-related information to the first node.

To be specific, when the measurement gap is the per-UE measurement gap, the UE may directly report one per-UE measurement gap to the first node. When the measurement gap is the per-CG measurement gap, the UE may directly report the per-CG measurement gaps corresponding to the first node and the second node respectively to the first node. When the measurement gap is the per-CC measurement gap, the UE may directly report the per-CC measurement gaps corresponding to the first node and the second node respectively to the first node.

2. The UE may report the measurement gap configuration-related information to the second node.

To be specific, when the measurement gap is the per-UE measurement gap, the UE may directly report one per-UE measurement gap to the second node. When the measurement gap is the per-CG measurement gap, the UE may directly report the per-CG measurement gaps corresponding to the first node and the second node respectively to the second node. When the measurement gap is the per-CC measurement gap, the UE may directly report the per-CC measurement gaps corresponding to the first node and the second node respectively to the second node.

3. The UE may report the measurement gap configuration-related information to the first node and the second node respectively.

To be specific, when the measurement gap is the per-UE measurement gap, the UE may directly report one per-UE measurement gap to the first node and the second node. When the measurement gap is the per-CG measurement gap, the UE may report the per-CG measurement gap corresponding to the first node to the first node, and report the per-CG measurement gap corresponding to the second node to the second node. When the measurement gap is the per-CC measurement gap, the UE may report the per-CC measurement gap corresponding to the first node to the first node, and report the per-CC measurement gap corresponding to the second node to the second node.

It should be appreciated that, the UE may report the measurement gap configuration-related information through a predetermined target message or an auxiliary message. Correspondingly, the first node may acquire the measurement gap configuration-related information from the predetermined target message or auxiliary message from the UE. The predetermined target message may be a Radio Resource Control (RRC) message or a capability report message.

When reporting the measurement gap configuration-related information, the UE may enable a timer for prohibiting the report of the measurement gap configuration-related information. At this time, before the expiration of the timer, the measurement gap configuration-related information may not be reported.

It should be appreciated that, the first node and the second node may also enable the report of the measurement gap configuration-related information. To be specific, the first node and the second node may each transmit indication information to the UE, and the indication information is used to indicate whether the measurement gap configuration-related information is allowed to be reported.

It should be appreciated that, in Case 4, the configuration policy may also be used for the subsequent processings like in Case 2, which will not be particularly defined herein.

Case 5: the first node and the second node may configure the measurement gaps independently.

During the configuration, when the measurement gap is the per-CG measurement gap, the first node may configure the per-CG measurement gap corresponding to the first node, and the second node may configure the per-CG measurement gap corresponding to the second node. When the measurement gap is the per-CC measurement gap, the first node may configure the measurement gaps for all the CCs corresponding to the first node, and the second node may configure the measurement gaps for all the CCs corresponding to the second node.

Before the configuration by the first node and the second node independently, the request may be transmitted by the UE in Case 4. In other words, the UE may report the required measurement gap to the first node, and at this time, the first node needs to notify the second node of the per-CG measurement gap or all the per-CC measurement gaps corresponding to the second node (via the X2 interface or the S1 interface as mentioned above). The UE may report the required measurement gap to the second node, and at this time, the second node needs to notify the first node of the per-CG measurement gap or all the per-CC measurement gaps (via the X2 interface or the S1 interface as mentioned above). In addition, the UE may also transmit the requirement measurement gaps to the first node and the second node respectively.

It should be appreciated that, when measurement gaps have been received by the UE from the first node and the second node simultaneously and the measurement gap corresponding to the first node is different from the measurement gap corresponding to the second node, the UE may select the measurement gap as follows. When the measurement gap is a measurement gap for the UE (i.e., the per-UE measurement gap), the UE may select the measurement gap transmitted by the first node or the second node. When the measurement gap is a measurement gap for each cell group corresponding to the UE (i.e., the per-CG measurement gap) and/or a measurement gap for a component carrier corresponding to the UE (i.e., a per-CC measurement gap), the UE may select the measurement gap corresponding to the first node and transmitted by the first node, and select the measurement gap corresponding to the second node and transmitted by the second node.

It should be further appreciated that, the above-mentioned functions capable of being achieved at the first node may also be achieved at the second node, and vice versa.

According to the embodiments of the present disclosure, it is able to coordinate the configuration of the measurement gap between the slave nodes and between the master node and the slave node, thereby to ensure the integrity of the NR network communication as well as the reliability and validity of the network communication.

Figure 3:
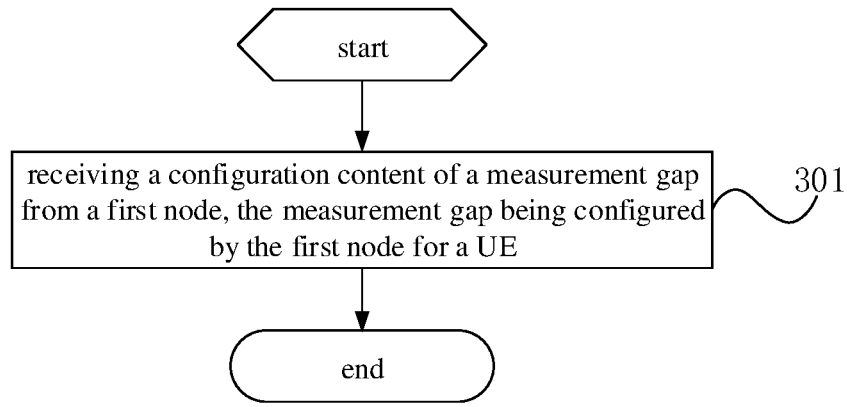
FIG. 3 is another flow chart of a measurement gap configuration method according to one embodiment of the present disclosure.

The present disclosure further provides in some embodiments a measurement gap configuration method for a second node which, as shown in FIG. 3, includes Step 301 of receiving a configuration content of a measurement gap from a first node. The measurement gap is configured by the first node for a UE, and includes at least one of a per-UE measurement gap for the UE, a per-CG measurement gap for each cell group corresponding to the UE, and a per-CC measurement gap for a component carrier corresponding to the UE.

Subsequent to receiving the configuration content of the measurement gap from the first node, the measurement gap configuration method may further include configuring the measurement gap for the UE in accordance with the configuration content of the measurement gap.

The measurement gap configuration method may further include transmitting the configuration content of the measurement gap to the first node.

Further, the transmitting the configuration content of the measurement gap to the first node may include transmitting the configuration content of the measurement gap to the first node via an X2 interface or an S1 interface for OAM architecture; or transmitting the configuration content of the measurement gap to the UE, so that the UE reports the configuration content of the measurement gap to the first node.

Further, the receiving the configuration content of the measurement gap from the first node may include: receiving the configuration content of the measurement gap from the first node via the X2 interface or the S1 interface for the OAM architecture; or receiving the configuration content of the measurement gap forwarded by the UE.

Further, the configuration content of the measurement gap may include at least one of a configuration content of the per-UE measurement gap for the UE, a configuration content of the measurement gap corresponding to the first node, and a configuration content of the measurement gap corresponding to the second node.

The configuration content of the measurement gap corresponding to the first node may include at least one of a configuration content of the per-CG measurement gap for each cell group corresponding to the UE, and a configuration content of the per-CC measurement gap for a component carrier corresponding to the UE.

The configuration content of the measurement gap corresponding to the second node may include at least one of a configuration content of the per-CG measurement gap for each cell group corresponding to the UE, and a configuration content of the per-CC measurement gap for a component carrier corresponding to the UE.

Further, the receiving the configuration content of the measurement gap from the first node may include: transmitting request information about the measurement gap corresponding to the second node to the first node; and acquiring the configuration content of the measurement gap transmitted by the first node in accordance with the request information. The request information may include at least one of a configuration request and a configuration policy.

Further, the transmitting the request information about the measurement gap corresponding to the second node to the first node may include: transmitting the request information about the measurement gap corresponding to the second node to the first node via the X2 interface or the S1 interface for the OAM architecture; or transmitting the request information about the measurement gap corresponding to the second node to the UE, so that the UE reports the request information about the measurement gap corresponding to the second node to the first node.

Prior to receiving the measurement gap from the first node, the measurement gap configuration method may further include transmitting the configuration policy of the measurement gap to a central control node so that the central control node determines the configuration content of the measurement gap in accordance with the configuration policy, and receiving the configuration content from the central control node.

The measurement gap configuration method may further include configuring the measurement gap for the UE in accordance with the configuration content of the measurement gap. The measurement gap may include a measurement gap corresponding to the first node and/or a measurement gap corresponding to the second node.

Subsequent to configuring the measurement gap for the UE, the measurement gap configuration method may further include transmitting the configured measurement gap to the UE. The measurement gap may include at least one of a measurement gap for the UE, a measurement gap corresponding to the first node and a measurement gap corresponding to the second node.

The measurement gap configuration method may further include acquiring measurement gap configuration-related information reported by the UE. The measurement gap configuration-related information may include a measurement gap required by the UE and/or a measurement gap supported by UE capability.

Subsequent to acquiring the measurement gap configuration-related information reported by the UE, the measurement gap configuration method may further include transmitting the measurement gap configuration-related information to the first node.

Further, the receiving the configuration content of the measurement gap from the first node may include receiving the configuration content of the measurement gap transmitted by the first node in accordance with the measurement gap configuration-related information.

Subsequent to receiving the configuration content of the measurement gap transmitted by the first node in accordance with the measurement gap configuration-related information, the measurement gap configuration method may further include configuring the measurement gap for the UE in accordance with the configuration content.

Subsequent to acquiring the measurement gap configuration-related information reported by the UE, the measurement gap configuration method may further include configuring the measurement gap for the UE in accordance with the measurement gap configuration-related information.

Further, the acquiring the measurement gap configuration-related information reported by the UE may include acquiring the measurement gap configuration-related information reported by the UE from a predetermined target message or an auxiliary message from the UE. The predetermined target message may include an RRC message or a capability report message.

Prior to acquiring the measurement gap configuration-related information reported by the UE, the measurement gap configuration method may further include transmitting indication information to the UE, and the indication information is used to indicate whether the measurement gap configuration-related information is allowed to be reported.

Subsequent to configuring the measurement gap for the UE, the measurement gap configuration method may further include notifying the first node of the configuration content of the measurement gap. The configuration content of the measurement gap may include a configuration content of the measurement gap corresponding to the second node.

Further, the notifying the first node of the configuration content of the measurement gap may include: notifying the first node of the configuration content of the measurement gap via the X2 interface or the S1 interface for the OAM architecture; or transmitting the configuration content of the measurement gap to the UE, so that the UE reports the configuration content of the measurement gap to the first node.

Subsequent to configuring the measurement gap for the UE, the measurement gap configuration method may further include transmitting the configured measurement gap to the UE. The measurement gap may include at least one of a measurement gap for the UE, a measurement gap corresponding to the first node, and a measurement gap corresponding to the second node.

It should be appreciated that, all the description about the second node in the above-mentioned embodiments involving the measurement gap configuration method for the first node may be applied to the embodiments involving the measurement gap configuration method for the second node, with a same technical effect.

Figure 4:
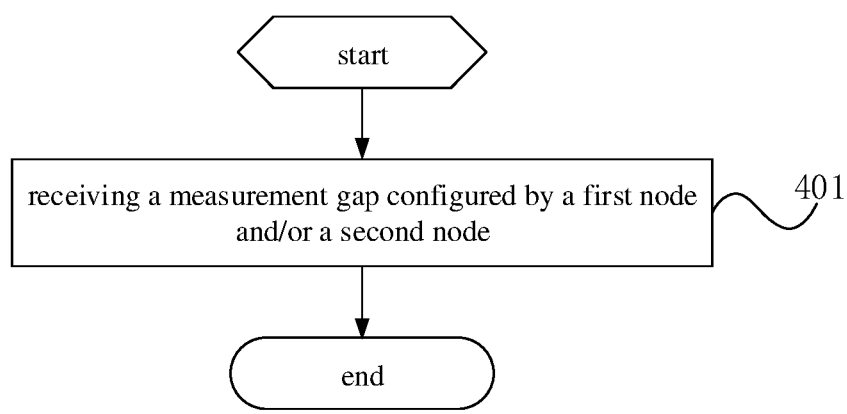
FIG. 4 is yet another flow chart of a measurement gap configuration method according to one embodiment of the present disclosure.

The present disclosure further provides in some embodiments a measurement gap configuration method for a UE which, as shown in FIG. 4, includes Step 401 of receiving a measurement gap configured by a first node and/or a second node. The measurement gap includes at least one of a per-UE measurement gap for the UE, a per-CG measurement gap for each cell group corresponding to the UE, and a per-CC measurement gap for a component carrier corresponding to the UE.

Upon the receipt of the measurement gap from the first node, the measurement gap configuration method may further include transmitting a configuration content of the measurement gap to the second node. The configuration content of the measurement gap may include a configuration content of the measurement gap corresponding to the first node, or a configuration content of the measurement gap corresponding to each of the first node and the second node.

The measurement gap configuration method may further include receiving request information about the measurement gap from the second node, and transmitting the request information to the first node. The request information may include at least one of a configuration request and a configuration policy.

The measurement gap configuration method may further include transmitting measurement gap configuration-related information to at least one of the first node and the second node. The measurement gap configuration-related information may include a measurement gap required by the UE and/or a measurement gap supported by UE capability.

The transmitting the measurement gap configuration-related information to at least one of the first node and the second node may include: adding the measurement gap configuration-related information into a predetermined message to generate a predetermined target message; and transmitting the measurement gap configuration-related information to the at least one of the first node and the second node through the predetermined target message. The predetermined target message may include an RRC message or a capability report message.

Further, the transmitting the measurement gap configuration-related information to at least one of the first node and the second node may include: generating an auxiliary message including the measurement gap configuration-related information; and transmitting the measurement gap configuration-related information to at least one of the first node and the second node through the auxiliary message.

The measurement gap configuration method may further include enabling a timer for prohibiting the reporting of the measurement gap configuration-related information. Before the timer for prohibiting the reporting of the measurement gap configuration-related information is expired, the measurement gap configuration-related information may not be reported.

Further, the transmitting the measurement gap configuration-related information to at least one of the first node and the second node may include: receiving indication information from at least one of the first node and the second node, the indication information being used to indicate whether the measurement gap configuration-related information is allowed to be reported; and when the indication information indicates that the measurement gap configuration-related information is allowed to be reported, transmitting the measurement gap configuration-related information to at least one of the first node and the second node.

When the measurement gaps have been received from the first node and the second node simultaneously and the measurement gap corresponding to the first node is different from the measurement gap corresponding to the second node, the measurement gap configuration method may further include: when the measurement gap is a per-UE measurement gap for the UE, selecting the measurement gap transmitted by the first node or the second node; and when the measurement gap is a per-CG measurement gap for each cell group corresponding to the UE and/or a per-CC measurement gap for a component carrier corresponding to the UE, selecting the measurement gap corresponding to the first node and transmitted by the first node, and selecting the measurement gap corresponding to the second node and transmitted by the second node.

It should be appreciated that, all the description about the UE in the above-mentioned embodiments involving the measurement gap configuration method for the first node may be applied to the embodiments involving the measurement gap configuration method for the UE, with a same technical effect.

The present disclosure further provides in some embodiments a first node, which includes a first configuration module configured to configure a measurement gap for a UE. The measurement gap includes at least one of a per-UE measurement gap for the UE, a per-CG measurement gap for each cell group corresponding to the UE, and a per-CC measurement gap for a component carrier corresponding to the UE.

The first node may further include a first transmission module configured to transmit a configuration content of the measurement gap to the second node.

The first transmission module is further configured to: transmit the configuration content of the measurement gap to the second node via an X2 interface or an S1 interface for OAM architecture; or transmit the configuration content of the measurement gap to the UE, so that the UE reports the configuration content of the measurement gap to the second node.

The first node may further include a first reception module configured to receive the configuration content of the measurement gap from the second node.

The first reception module is further configured to: receive the configuration content of the measurement gap from the second node via the X2 interface or the S1 interface for the OAM architecture; or receive the configuration content of the measurement gap forwarded by the UE.

Further, the configuration content of the measurement gap may include at least one of a configuration content of the per-UE measurement gap for the UE, a configuration content of the measurement gap corresponding to the first node, and a configuration content of the measurement gap corresponding to the second node.

The configuration content of the measurement gap corresponding to the first node may include at least one of a configuration content of a per-CG measurement gap for each cell group corresponding to the UE and a configuration content of a per-CC measurement gap for a component carrier corresponding to the UE.

The configuration content of the measurement gap corresponding to the second node may include at least one of a configuration content of a per-CG measurement gap for each cell group corresponding to the UE and a configuration content of a per-CC measurement gap for a component carrier corresponding to the UE.

The first node may further include a first acquisition module configured to acquire request information about the measurement gap from the second node. The request information may include at least one of a configuration request and a configuration policy.

The first acquisition module is further configured to: receive the request information about the measurement gap from the second node via the X2 interface or the S1 interface for the OAM architecture; or receive the request information about the measurement gap forwarded by the UE.

The first configuration module is further configured to configure the measurement gap for the UE in accordance with the request information. The measurement gap may include at least one of a per-UE measurement gap for the UE, a measurement gap corresponding to the first node, and a measurement gap corresponding to the second node.

The first node may further include a second transmission module configured to transmit the configuration content of the measurement gap corresponding to the second node to the second node.

The first node may further include a first determination module configured to determine the configuration content of the measurement gap corresponding to the second node in accordance with the request information.

The first node may further include a third transmission module configured to transmit the configuration content of the measurement gap corresponding to the second node to the second node.

Further, the measurement gap configured by the first node for the UE may the measurement gap corresponding to the first node.

The first node may further include a second determination module configured to determine the configuration content of the measurement gap corresponding to each of the first node and the second node in accordance with the request information.

The first node may further include a fourth transmission module configured to transmit the configuration content of the measurement gap corresponding to each of the first node and the second node to the second node.

The first node may further include a fifth transmission module configured to transmit the configuration policy of the measurement gap to a central control node so that the central control node determines the configuration content of the measurement gap in accordance with the configuration policy, and receive the configuration content from the central control node.

The first configuration module is further configured to configure the measurement gap for the UE in accordance with the configuration content. The measurement gap configured by the first node for the UE may include the measurement gap corresponding to the first node, or the measurement gap corresponding to each of the first node and the second node.

The first configuration module is further configured to: acquire measurement gap configuration-related information reported by the UE or transmitted by the second node; and configure the measurement gap for the UE in accordance with the measurement gap configuration-related information. The measurement gap configuration-related information may include a measurement gap required by the UE and/or a measurement gap supported by UE capability.

The first node may further include a sixth transmission module configured to transmit measurement gap configuration-related information corresponding to the first node and/or measurement gap configuration-related information corresponding to the second node in the measurement gap configuration-related information to the second node.

The first node may further include a seventh transmission module configured to transmit a configuration content of the measurement gap corresponding to the second node and/or a configuration content of the measurement gap corresponding to each of the first node and the second node in the configured measurement gap to the second node.

When the measurement gap configuration-related information is reported by the UE, the first configuration module is further configured to acquire the measurement gap configuration-related information reported by the UE through a predetermined target message or an auxiliary message transmitted by the UE. The predetermined target message may include an RRC message or a capability report message.

The first node may further include an eighth transmission module configured to transmit indication information to the UE, and the indication information may be used to indicate whether the measurement gap configuration-related information is allowed to be reported.

The first node may further include a ninth transmission module configured to transmit the configured measurement gap to the UE. The measurement gap may include at least one of a per-UE measurement gap for the UE, a measurement gap corresponding to the first node, and a measurement gap corresponding to the second node.

Figure 5:
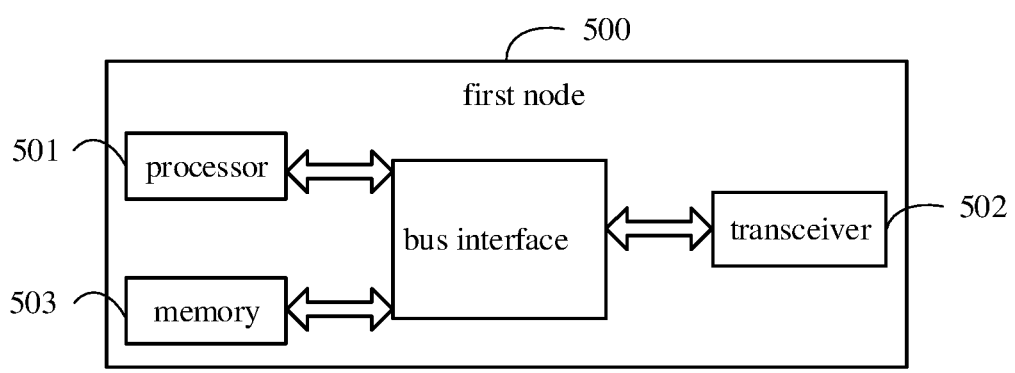
FIG. 5 is a schematic view showing a first node according to one embodiment of the present disclosure.

The present disclosure further provides in some embodiments a first node capable of implementing the above-mentioned measurement gap configuration method with a same technical effect. As shown in FIG. 5, the first node 500 includes a processor 501, a transceiver 502, a memory 503 and a bus interface. The processor 501 is configured to read a program stored in the memory 503 so as to configure a measurement gap for a UE. The measurement gap includes at least one of a per-UE measurement gap for the UE, a per-CG measurement gap for each cell group corresponding to the UE, and a per-CC measurement gap for a component carrier corresponding to the UE.

In FIG. 5, bus architecture may include any numbers of buses and bridges connected to each other, so as to connect various circuits for one or more processors 501 and one or more memories 503. In addition, as is known in the art, the bus architecture may be used to connect any other circuits, such as a circuit for a peripheral device, a circuit for a voltage stabilizer and a power management circuit, which will not be particularly defined herein. Bus interface may be provided, and the transceiver 502 may consist of more than one element, e.g., a transmitter and a receiver for communication with any other devices over a transmission medium. The processor 501 may take charge of managing the bus architecture as well general processings. The memory 503 may store data therein for the operation of the processor 501.

In a possible embodiment of the present disclosure, the processor 501 is further configured to transmit a configuration content of the measurement gap to the second node through the transceiver 502.

In a possible embodiment of the present disclosure, the processor 501 is further configured to: transmit the configuration content of the measurement gap to the second node via an X2 interface or an S1 interface for OAM architecture; or transmit the configuration content of the measurement gap to the UE, so that the UE reports the configuration content of the measurement gap to the second node.

In a possible embodiment of the present disclosure, the processor 501 is further configured to receive the configuration content of the measurement gap from the second node through the transceiver 502.

In a possible embodiment of the present disclosure, the processor 501 is further configured to: receive the configuration content of the measurement gap from the second node via the X2 interface or the S1 interface for the OAM architecture; or receive the configuration content of the measurement gap forwarded by the UE.

The configuration content of the measurement gap may include at least one of a configuration content of the per-UE measurement gap for the UE, a configuration content of the measurement gap corresponding to the first node, and a configuration content of the measurement gap corresponding to the second node.

The configuration content of the measurement gap corresponding to the first node may include at least one of a configuration content of a per-CG measurement gap for each cell group corresponding to the UE and a configuration content of a per-CC measurement gap for a component carrier corresponding to the UE.

The configuration content of the measurement gap corresponding to the second node may include at least one of a configuration content of a per-CG measurement gap for each cell group corresponding to the UE and a configuration content of a per-CC measurement gap for a component carrier corresponding to the UE.

In a possible embodiment of the present disclosure, the processor 501 is further configured to acquire request information about the measurement gap from the second node through the transceiver 502. The request information may include at least one of a configuration request and a configuration policy.

In a possible embodiment of the present disclosure, the processor 501 is further configured to: receive the request information about the measurement gap from the second node via the X2 interface or the S1 interface for the OAM architecture; or receive the request information about the measurement gap forwarded by the UE.

In a possible embodiment of the present disclosure, the processor 501 is further configured to configure the measurement gap for the UE in accordance with the request information. The measurement gap may include at least one of a per-UE measurement gap for the UE, a measurement gap corresponding to the first node, and a measurement gap corresponding to the second node.

In a possible embodiment of the present disclosure, the processor 501 is further configured to transmit the configuration content of the measurement gap corresponding to the second node to the second node through the transceiver 502.

In a possible embodiment of the present disclosure, the processor 501 is further configured to determine the configuration content of the measurement gap corresponding to the second node in accordance with the request information.

In a possible embodiment of the present disclosure, the processor 501 is further configured to transmit the configuration content of the measurement gap corresponding to the second node to the second node through the transceiver 502.

The measurement gap configured by the first node for the UE may the measurement gap corresponding to the first node.

In a possible embodiment of the present disclosure, the processor 501 is further configured to determine the configuration content of the measurement gap corresponding to each of the first node and the second node in accordance with the request information.

In a possible embodiment of the present disclosure, the processor 501 is further configured to transmit the configuration content of the measurement gap corresponding to each of the first node and the second node to the second node through the transceiver 502.

In a possible embodiment of the present disclosure, the processor 501 is further configured to transmit the configuration policy of the measurement gap to a central control node through the transceiver 502 so that the central control node determines the configuration content of the measurement gap in accordance with the configuration policy, and receive the configuration content from the central control node.

In a possible embodiment of the present disclosure, the processor 501 is further configured to configure the measurement gap for the UE in accordance with the configuration content. The measurement gap configured by the first node for the UE may include the measurement gap corresponding to the first node, or the measurement gap corresponding to each of the first node and the second node.

In a possible embodiment of the present disclosure, the processor 501 is further configured to: acquire measurement gap configuration-related information reported by the UE or transmitted by the second node; and configure the measurement gap for the UE in accordance with the measurement gap configuration-related information. The measurement gap configuration-related information may include a measurement gap required by the UE and/or a measurement gap supported by UE capability.

In a possible embodiment of the present disclosure, the processor 501 is further configured to transmit measurement gap configuration-related information corresponding to the first node and/or measurement gap configuration-related information corresponding to the second node in the measurement gap configuration-related information to the second node through the transceiver 502.

In a possible embodiment of the present disclosure, the processor 501 is further configured to transmit a configuration content of the measurement gap corresponding to the second node and/or a configuration content of the measurement gap corresponding to each of the first node and the second node in the configured measurement gap to the second node through the transceiver 502.

In a possible embodiment of the present disclosure, the processor 501 is further configured to acquire the measurement gap configuration-related information reported by the UE through a predetermined target message or an auxiliary message transmitted by the UE. The predetermined target message may include an RRC message or a capability report message.

In a possible embodiment of the present disclosure, the processor 501 is further configured to transmit indication information to the UE through the transceiver 502, and the indication information may be used to indicate whether the measurement gap configuration-related information is allowed to be reported.

In a possible embodiment of the present disclosure, the processor 501 is further configured to transmit the configured measurement gap to the UE through the transceiver 502. The measurement gap may include at least one of a per-UE measurement gap for the UE, a measurement gap corresponding to the first node, and a measurement gap corresponding to the second node.

The first node in the embodiments of the present disclosure is capable of implementing the corresponding steps in the above-mentioned measurement gap configuration method, which will thus not be particularly defined herein.

According to the first node in the embodiments of the present disclosure, it is able to ensure the integrity of the NR network communication as well as the reliability and validity of the network communication.

The present disclosure further provides in some embodiments a second node which includes a second reception module configured to receive a configuration content of a measurement gap from a first node. The measurement gap is configured by the first node for a UE, and includes at least one of a per-UE measurement gap for the UE, a per-CG measurement gap for each cell group corresponding to the UE, and a per-CC measurement gap for a component carrier corresponding to the UE.

The second node may further include a second configuration module configured to configure the measurement gap for the UE in accordance with a configuration content of the measurement gap.

The second node may further include a ninth transmission module configured to transmit the configuration content of the measurement gap to the first node.

The ninth transmission module is further configured to: transmit the configuration content of the measurement gap to the first node via an X2 interface or an S1 interface for OAM architecture; or transmit the configuration content of the measurement gap to the UE, so that the UE reports the configuration content of the measurement gap to the first node.

The second reception module is further configured to: receive the configuration content of the measurement gap from the first node via the X2 interface or the S1 interface for the OAM architecture; or receive the configuration content of the measurement gap forwarded by the UE.

Further, the configuration content of the measurement gap may include at least one of a configuration content of the measurement gap for the UE, a configuration content of the measurement gap corresponding to the first node, and a configuration content of the measurement gap corresponding to the second node.

The configuration content of the measurement gap corresponding to the first node may include at least one of a configuration content of the per-CG measurement gap for each cell group corresponding to the UE, and a configuration content of the per-CC measurement gap for a component carrier corresponding to the UE.

The configuration content of the measurement gap corresponding to the second node may include at least one of a configuration content of the per-CG measurement gap for each cell group corresponding to the UE, and a configuration content of the per-CC measurement gap for a component carrier corresponding to the UE.

Further, the second reception module may include: a first transmission unit configured to transmit request information about the measurement gap corresponding to the second node to the first node; and an acquisition unit configured to acquire the configuration content of the measurement gap transmitted by the first node in accordance with the request information. The request information may include at least one of a configuration request and a configuration policy.

The first transmission unit is further configured to: transmit the request information about the measurement gap corresponding to the second node to the first node via the X2 interface or the S1 interface for the OAM architecture; or transmit the request information about the measurement gap corresponding to the second node to the UE, so that the UE reports the request information about the measurement gap corresponding to the second node to the first node.

The second node may further include a tenth transmission module configured to transmit the configuration policy of the measurement gap to a central control node so that the central control node determines the configuration content of the measurement gap in accordance with the configuration policy, and receive the configuration content from the central control node.

The second node may further include a third configuration module configured to configure the measurement gap for the UE in accordance with the configuration content of the measurement gap. The measurement gap may include a measurement gap corresponding to the first node and/or a measurement gap corresponding to the second node.

The second node may further include an eleventh transmission module configured to transmit the configured measurement gap to the UE. The measurement gap may include at least one of a per-UE measurement gap for the UE, a measurement gap corresponding to the first node and a measurement gap corresponding to the second node.

The second node may further include an acquisition module configured to acquire measurement gap configuration-related information reported by the UE. The measurement gap configuration-related information may include a measurement gap required by the UE and/or a measurement gap supported by UE capability.

The second node may further include a twelfth transmission module configured to transmit the measurement gap configuration-related information to the first node.

The second reception module is further configured to receive the configuration content of the measurement gap transmitted by the first node in accordance with the measurement gap configuration-related information.

The second node may further include a fourth configuration module configured to configure the measurement gap for the UE in accordance with the configuration content.

The second node may further include a fifth configuration module configured to configure the measurement gap for the UE in accordance with the measurement gap configuration-related information.

The acquisition module is further configured to acquire the measurement gap configuration-related information reported by the UE from a predetermined target message or an auxiliary message from the UE. The predetermined target message may include an RRC message or a capability report message.

The second node may further include a thirteenth transmission module configured to transmit indication information to the UE, and the indication information is used to indicate whether the measurement gap configuration-related information is allowed to be reported.

The second node may further include a notification module configured to notify the first node of the configuration content of the measurement gap. The configuration content of the measurement gap may include a configuration content of the measurement gap corresponding to the second node.

The notification module is further configured to: notify the first node of the configuration content of the measurement gap via the X2 interface or the S1 interface for the OAM architecture; or transmit the configuration content of the measurement gap to the UE, so that the UE reports the configuration content of the measurement gap to the first node.

The second node may further include a fourteenth transmission module configured to transmit the configured measurement gap to the UE. The measurement gap may include at least one of a per-UE measurement gap for the UE, a measurement gap corresponding to the first node, and a measurement gap corresponding to the second node.

Figure 6:
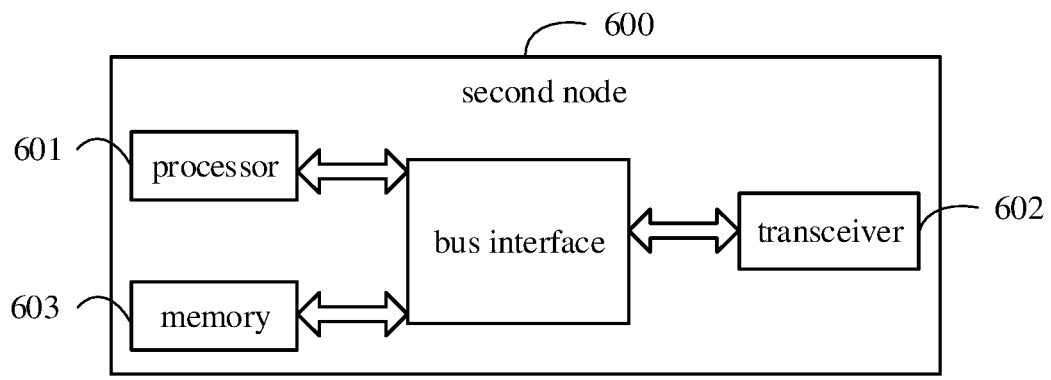
FIG. 6 is a schematic view showing a second node according to one embodiment of the present disclosure.

The present disclosure further provides in some embodiments a second node capable of implementing the above-mentioned measurement gap configuration method for the second node, with a same technical effect. As shown in FIG. 6, the second node 600 includes a processor 601, a transceiver 602, a memory 603 and a bus interface. The processor 601 is configured to read a program stored in the memory 603, so as to receive a configuration content of a measurement gap from a first node through the transceiver 602. The measurement gap is configured by the first node for a UE, and includes at least one of a per-UE measurement gap for the UE, a per-CG measurement gap for each cell group corresponding to the UE, and a per-CC measurement gap for a component carrier corresponding to the UE.

In FIG. 6, bus architecture may include any numbers of buses and bridges connected to each other, so as to connect various circuits for one or more processors 601 and one or more memories 603. In addition, as is known in the art, the bus architecture may be used to connect any other circuits, such as a circuit for a peripheral device, a circuit for a voltage stabilizer and a power management circuit, which will not be particularly defined herein. Bus interface may be provided, and the transceiver 602 may consist of more than one element, e.g., a transmitter and a receiver for communication with any other devices over a transmission medium. The processor 601 may take charge of managing the bus architecture as well general processings. The memory 603 may store data therein for the operation of the processor 601.

In a possible embodiment of the present disclosure, the processor 601 is further configured to configure the measurement gap for the UE in accordance with a configuration content of the measurement gap.

In a possible embodiment of the present disclosure, the processor 601 is further configured to transmit the configuration content of the measurement gap to the first node through the transceiver 602.

In a possible embodiment of the present disclosure, the processor 601 is further configured to: transmit the configuration content of the measurement gap to the first node via an X2 interface or an S1 interface for OAM architecture; or transmit the configuration content of the measurement gap to the UE, so that the UE reports the configuration content of the measurement gap to the first node.

In a possible embodiment of the present disclosure, the processor 601 is further configured to: receive the configuration content of the measurement gap from the first node via the X2 interface or the S1 interface for the OAM architecture; or receive the configuration content of the measurement gap forwarded by the UE.

Further, the configuration content of the measurement gap may include at least one of a configuration content of the per-UE measurement gap for the UE, a configuration content of the measurement gap corresponding to the first node, and a configuration content of the measurement gap corresponding to the second node.

The configuration content of the measurement gap corresponding to the first node may include at least one of a configuration content of the per-CG measurement gap for each cell group corresponding to the UE, and a configuration content of the per-CC measurement gap for a component carrier corresponding to the UE.

The configuration content of the measurement gap corresponding to the second node may include at least one of a configuration content of the per-CG measurement gap for each cell group corresponding to the UE, and a configuration content of the per-CC measurement gap for a component carrier corresponding to the UE.

In a possible embodiment of the present disclosure, the processor 601 is further configured to: transmit request information about the measurement gap corresponding to the second node to the first node through the transceiver 602; and acquire the configuration content of the measurement gap transmitted by the first node in accordance with the request information. The request information may include at least one of a configuration request and a configuration policy.

In a possible embodiment of the present disclosure, the processor 601 is further configured to: transmit the request information about the measurement gap corresponding to the second node to the first node via the X2 interface or the S1 interface for the OAM architecture; or transmit the request information about the measurement gap corresponding to the second node to the UE, so that the UE reports the request information about the measurement gap corresponding to the second node to the first node.

In a possible embodiment of the present disclosure, the processor 601 is further configured to transmit the configuration policy of the measurement gap to a central control node through the transceiver 602 so that the central control node determines the configuration content of the measurement gap in accordance with the configuration policy, and receive the configuration content from the central control node.

In a possible embodiment of the present disclosure, the processor 601 is further configured to configure the measurement gap for the UE in accordance with the configuration content of the measurement gap. The measurement gap may include a measurement gap corresponding to the first node and/or a measurement gap corresponding to the second node.

In a possible embodiment of the present disclosure, the processor 601 is further configured to transmit the configured measurement gap to the UE through the transceiver 602. The measurement gap may include at least one of a per-UE measurement gap for the UE, a measurement gap corresponding to the first node and a measurement gap corresponding to the second node.

In a possible embodiment of the present disclosure, the processor 601 is further configured to acquire measurement gap configuration-related information reported by the UE. The measurement gap configuration-related information may include a measurement gap required by the UE and/or a measurement gap supported by UE capability.

In a possible embodiment of the present disclosure, the processor 601 is further configured to transmit the measurement gap configuration-related information to the first node through the transceiver 602.

In a possible embodiment of the present disclosure, the processor 601 is further configured to receive the configuration content of the measurement gap transmitted by the first node in accordance with the measurement gap configuration-related information through the transceiver 602.

In a possible embodiment of the present disclosure, the processor 601 is further configured to configure the measurement gap for the UE in accordance with the configuration content.

In a possible embodiment of the present disclosure, the processor 601 is further configured to configure the measurement gap for the UE in accordance with the measurement gap configuration-related information.

In a possible embodiment of the present disclosure, the processor 601 is further configured to acquire the measurement gap configuration-related information reported by the UE from a predetermined target message or an auxiliary message from the UE. The predetermined target message may include an RRC message or a capability report message.

In a possible embodiment of the present disclosure, the processor 601 is further configured to transmit indication information to the UE through the transceiver 602, and the indication information is used to indicate whether the measurement gap configuration-related information is allowed to be reported.

In a possible embodiment of the present disclosure, the processor 601 is further configured to notify the first node of the configuration content of the measurement gap through the transceiver 602. The configuration content of the measurement gap may include a configuration content of the measurement gap corresponding to the second node.

In a possible embodiment of the present disclosure, the processor 601 is further configured to: notify the first node of the configuration content of the measurement gap via the X2 interface or the S1 interface for the OAM architecture; or transmit the configuration content of the measurement gap to the UE, so that the UE reports the configuration content of the measurement gap to the first node.

In a possible embodiment of the present disclosure, the processor 601 is further configured to transmit the configured measurement gap to the UE through the transceiver 602. The measurement gap may include at least one of a per-UE measurement gap for the UE, a measurement gap corresponding to the first node, and a measurement gap corresponding to the second node.

The second node in the embodiments of the present disclosure is capable of implementing the corresponding steps of the above-mentioned measurement gap configuration method for the second node, which will not be particularly defined herein.

According to the second node in the embodiments of the present disclosure, it is able to ensure the integrity of the NR network communication as well as the reliability and validity of the network communication.

The present disclosure further provides in some embodiments a UE which includes a third reception module configured to receive a measurement gap configured by a first node and/or a second node. The measurement gap includes at least one of a per-UE measurement gap for the UE, a per-CG measurement gap for each cell group corresponding to the UE, and a per-CC measurement gap for a component carrier corresponding to the UE.

The UE may further include a fifteenth transmission module configured to transmit a configuration content of the measurement gap to the second node. The configuration content of the measurement gap may include a configuration content of the measurement gap corresponding to the first node, or a configuration content of the measurement gap corresponding to each of the first node and the second node.

The UE may further include a fourth reception module configured to receive request information about the measurement gap from the second node, and transmit the request information to the first node. The request information may include at least one of a configuration request and a configuration policy.

The UE may further include a sixteenth transmission module configured to transmit measurement gap configuration-related information to at least one of the first node and the second node. The measurement gap configuration-related information may include a measurement gap required by the UE and/or a measurement gap supported by UE capability.

The sixteenth transmission module may include: a first generation unit configured to add the measurement gap configuration-related information into a predetermined message to generate a predetermined target message; and a second transmission unit configured to transmit the measurement gap configuration-related information to the at least one of the first node and the second node through the predetermined target message. The predetermined target message may include an RRC message or a capability report message.

The sixteenth transmission module may include: a second generation unit configured to generate an auxiliary message including the measurement gap configuration-related information; and a third transmission unit configured to transmit the measurement gap configuration-related information to at least one of the first node and the second node through the auxiliary message.

The UE may further include an enabling module configured to enable a timer for prohibiting the reporting of the measurement gap configuration-related information. Before the timer for prohibiting the reporting of the measurement gap configuration-related information is expired, the measurement gap configuration-related information may not be reported.

The sixteenth transmission module may include: an indication information reception module configured to receive indication information from at least one of the first node and the second node, the indication information being used to indicate whether the measurement gap configuration-related information is allowed to be reported; and a fourth transmission unit configured to, when the indication information indicates that the measurement gap configuration-related information is allowed to be reported, transmit the measurement gap configuration-related information to at least one of the first node and the second node.

When the measurement gaps have been received from the first node and the second node simultaneously and the measurement gap corresponding to the first node is different from the measurement gap corresponding to the second node, the UE may further include: a first selection module configured to, when the measurement gap is a per-UE measurement gap for the UE, select the measurement gap transmitted by the first node or the second node; and a second selection module configured to, when the measurement gap is a per-CG measurement gap for each cell group corresponding to the UE and/or a per-CC measurement gap for a component carrier corresponding to the UE, select the measurement gap corresponding to the first node and transmitted by the first node, and select the measurement gap corresponding to the second node and transmitted by the second node.

Figure 7:
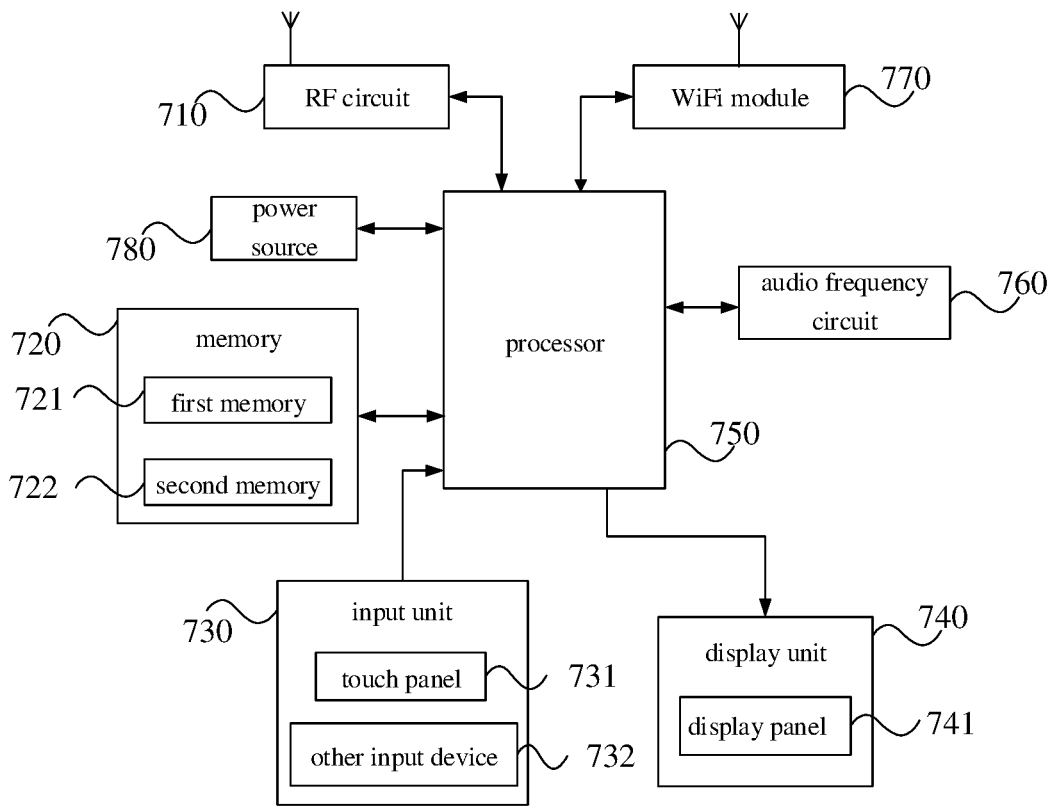
FIG. 7 is a schematic view showing a UE according to one embodiment of the present disclosure.

As shown in FIG. 7, the present disclosure further provides in some embodiments a UE. The UE may be a mobile phone, a flat-panel computer, a Personal Digital Assistant (PDA) or a vehicle-mounted computer.

In FIG. 7, the UE may include a Radio Frequency (RF) circuit 710, a memory 720, an input unit 730, a display unit 740, a processor 750, an audio frequency circuit 760, a Wireless Fidelity (WiFi) module 770 and a power source 780.

The input unit 730 is configured to receive digital or character information inputted by a user, and generate a signal input related to user settings and function control of the UE. To be specific, the input unit 730 may include a touch panel 731. The touch panel 731, also called as touch screen, is configured to collect a touch operation made by the user on or in proximity to the touch panel (e.g., an operation made by the user through any appropriate object or attachment (e.g., finger or stylus) on or in the proximity to the touch panel 731), and drive a corresponding connection device in accordance with a predetermined program. The touch panel 731 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 750, and receive and execute a command from the processor 750. In addition, the touch panel 731 may be of a resistive type, a capacitive type, an infrared type or a surface acoustic wave (SAW) type. Apart from the touch panel 731, the input unit 730 may further include an input device 732 which may include, but not limited to, a physical keyboard, a functional button (e.g., a volume control button or an on/off button), a trackball, a mouse, and a joystick.

The display unit 740 is configured to display information inputted by the user or information to be presented to the user, and various interfaces for the UE, and it may include a display panel 741. In a possible embodiment of the present disclosure, the display panel 741 may be a Liquid Crystal Display (LCD) panel or an Organic Light-Emitting Diode (OLED) panel.

It should be appreciated that, the touch panel 731 may cover the display panel 741, so as to form a touch display panel. When the touch operation made on or in proximity to the touch display panel has been detected, the touch information may be transmitted to the processor 750 so as to determine a type of a touch event. Then, the processor 750 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 750 may be a control center of the UE, and connected to each member of the entire UE via various interfaces and lines. The processor 750 is configured to run or execute software programs and/or modules stored in a first memory 721, and call data stored in a second memory 722, so as to achieve various functions of the UE and process the data, thereby to monitor the UE. In a possible embodiment of the present disclosure, the processor 750 may include one or more processing units.

In some embodiments of the present disclosure, through calling a program or instruction stored in the first memory 721 and/or the data stored in the second memory 722, the processor 750 is configured to receive a measurement gap configured by a first node and/or a second node. The measurement gap includes at least one of a per-UE measurement gap for the UE, a per-CG measurement gap for each cell group corresponding to the UE, and a per-CC measurement gap for a component carrier corresponding to the UE.

In a possible embodiment of the present disclosure, the processor 750 is further configured to transmit a configuration content of the measurement gap to the second node. The configuration content of the measurement gap may include a configuration content of the measurement gap corresponding to the first node, or a configuration content of the measurement gap corresponding to each of the first node and the second node.

In a possible embodiment of the present disclosure, the processor 750 is further configured to receive request information about the measurement gap from the second node, and transmit the request information to the first node. The request information may include at least one of a configuration request and a configuration policy.

In a possible embodiment of the present disclosure, the processor 750 is further configured to transmit measurement gap configuration-related information to at least one of the first node and the second node. The measurement gap configuration-related information may include a measurement gap required by the UE and/or a measurement gap supported by UE capability.

In a possible embodiment of the present disclosure, when no new data needs to be transmitted, the processor 750 is further configured to: add the measurement gap configuration-related information into a predetermined message to generate a predetermined target message; and transmit the measurement gap configuration-related information to the at least one of the first node and the second node through the predetermined target message. The predetermined target message may include an RRC message or a capability report message.

In a possible embodiment of the present disclosure, when no new data needs to be transmitted, the processor 750 is further configured to: generate an auxiliary message including the measurement gap configuration-related information; and transmit the measurement gap configuration-related information to at least one of the first node and the second node through the auxiliary message.

In a possible embodiment of the present disclosure, the processor 750 is further configured to enable a timer for prohibiting the reporting of the measurement gap configuration-related information. Before the timer for prohibiting the reporting of the measurement gap configuration-related information is expired, the measurement gap configuration-related information may not be reported.

In a possible embodiment of the present disclosure, the processor 750 is further configured to: receive indication information from at least one of the first node and the second node, the indication information being used to indicate whether the measurement gap configuration-related information is allowed to be reported; and when the indication information indicates that the measurement gap configuration-related information is allowed to be reported, transmit the measurement gap configuration-related information to at least one of the first node and the second node.

In a possible embodiment of the present disclosure, when the measurement gaps have been received from the first node and the second node simultaneously and the measurement gap corresponding to the first node is different from the measurement gap corresponding to the second node, the processor 750 is further configured to: when the measurement gap is a per-UE measurement gap for the UE, select the measurement gap transmitted by the first node or the second node; and when the measurement gap is a per-CG measurement gap for each cell group corresponding to the UE and/or a per-CC measurement gap for a component carrier corresponding to the UE, select the measurement gap corresponding to the first node and transmitted by the first node, and select the measurement gap corresponding to the second node and transmitted by the second node.

The UE in the embodiments of the present disclosure is capable of implementing the corresponding steps of the above-mentioned measurement gap configuration method for the UE, which will not be particularly defined herein.

According to the UE in the embodiments of the present disclosure, the measurement gap configured by the first node and/or the second node may be received through the processor 750, so it is able to ensure the integrity of the NR network communication as well as the reliability and validity of the network communication.

The above embodiments have been described in a progressive manner, and the same or similar contents in the embodiments will not be repeated, i.e., each embodiment merely focuses on the difference from the others.

It should be appreciated that, the present disclosure may be provided as a method, a device or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function in one or more flows in the flow chart and/or one or more blocks in the block diagram.

Although the optional embodiments are described above, a person skilled in the art may make modifications and alterations to these embodiments in accordance with the basic concept of the present disclosure. So, the attached claims are intended to include the optional embodiments and all of the modifications and alterations that fall within the scope of the present disclosure.

Although the present disclosure and its advantages have been described hereinabove, it should be appreciated that, various modifications, substitutions and alternations may be further made without departing from the spirit and scope defined by the appended claims. Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A first node, wherein the first node and a second node performs Dual connectivity (DC) with User Equipment (UE), and the first node, comprises a processor, a memory, and a network access program stored in the memory and executed by the processor, wherein the processor is configured to execute the network access program so as to implement:
configuring a measurement gap for the UE, wherein the measurement gap comprises at least one of a per-UE measurement gap for the UE, or a per-CC measurement gap for a component carrier corresponding to the UE;
wherein the processor is further configured to execute the network access program so as to implement:
prior to configuring the measurement gap for the UE,
acquiring request information about the measurement gap from a second node; wherein the request information comprises at least one of a configuration request or a configuration policy; wherein the configuration request is a request for configuring the measurement gap;
wherein the processor is further configured to execute the network access program so as to implement:
subsequent to configuring the measurement gap for the UE,
transmitting a configuration content of the measurement gap to the second node;
wherein the configuration content of the measurement gap comprises at least one of a configuration content of the per-UE measurement gap for the UE, or a configuration content of the measurement gap corresponding to the second node;
wherein the configuration content of the measurement gap corresponding to the second node comprises a configuration content of a per-CC measurement gap for a component carrier corresponding to the UE;
wherein the acquiring the request information about the measurement gap from the second node comprises:
receiving the request information about the measurement gap from the second node via the X2 interface or the S1 interface for the OAM architecture; or
receiving the request information about the measurement gap forwarded by the UE and transmitted by the second node.

2. The first node according to claim 1, wherein the configuring the measurement gap for the UE comprises:
acquiring measurement gap configuration-related information reported by the UE or transmitted by the second node; and
configuring the measurement gap for the UE in accordance with the measurement gap configuration-related information,
wherein the measurement gap configuration-related information comprises a measurement gap required by the UE and/or a measurement gap supported by UE capability.

3. The first node according to claim 2, wherein the processor is further configured to execute the network access program so as to implement:
subsequent to acquiring the measurement gap configuration-related information reported by the UE,
transmitting measurement gap configuration-related information corresponding to the first node and/or measurement gap configuration-related information corresponding to the second node in the measurement gap configuration-related information to the second node; or
wherein the processor is further configured to execute the network access program so as to implement:
subsequent to configuring the measurement gap for the UE in accordance with the measurement gap configuration-related information,
transmitting the configuration content of the measurement gap corresponding to the second node and/or the configuration content of the measurement gaps corresponding to the first node and the second node respectively to the second node; or
wherein when the measurement gap configuration-related information is reported by the UE, the acquiring the measurement gap configuration-related information reported by the UE comprises acquiring the measurement gap configuration-related information reported by the UE from a predetermined target message or an auxiliary message transmitted by the UE, and the predetermined target message comprises a Radio Resource Control (RRC) message or a capability report message; or
wherein the processor is further configured to execute the network access program so as to implement:
prior to acquiring the measurement gap configuration-related information reported by the UE,
transmitting indication information to the UE, and the indication information is used to indicate whether the measurement gap configuration-related information is allowed to be reported.

4. The first node according to claim 1, wherein the transmitting a configuration content of the measurement gap to a second node comprises:
transmitting the configuration content of the measurement gap to the second node via an X2 interface or an S1 interface for Operation, Administration and Maintenance (OAM) architecture; or
transmitting the configuration content of the measurement gap to the UE, so that the UE reports the configuration content of the measurement gap to the second node.

5. The first node according to claim 1, further comprising receiving a configuration content of the measurement gap from a second node.

6. The first node according to claim 5, wherein the receiving a configuration content of the measurement gap from a second node comprises:
receiving the configuration content of the measurement gap from the second node via the X2 interface or the S1 interface for the OAM architecture; or
receiving the configuration content of the measurement gap forwarded by the UE and transmitted by the second node.

7. The first node according to claim 1, wherein the configuration content of the measurement gap further comprises a configuration content of the measurement gap corresponding to the first node;
wherein the configuration content of the measurement gap corresponding to the first node comprises at least one of a configuration content of a per-CG measurement gap for each cell group corresponding to the UE, or a configuration content of a per-CC measurement gap for a component carrier corresponding to the UE;

wherein the configuration content of the measurement gap corresponding to the second node further comprises a configuration content of a per-CG measurement gap for each cell group corresponding to the UE.

8. The first node according to claim 1, wherein the configuring the measurement gap for the UE comprises configuring the measurement gap for the UE in accordance with the request information, and the measurement gap comprises at least one of a per-UE measurement gap for the UE, a measurement gap corresponding to the first node, or a measurement gap corresponding to the second node.

9. The first node according to claim 8, further comprising transmitting the configuration content of the measurement gap corresponding to the second node to the second node.

10. The first node according to claim 1, wherein the processor is further configured to execute the network access program so as to implement:
subsequent to acquiring the request information about the measurement gap from the second node,
determining the configuration content of the measurement gap corresponding to the second node in accordance with the request information.

11. The first node according to claim 10, wherein the processor is further configured to execute the network access program so as to implement:
subsequent to determining the configuration content of the measurement gap corresponding to the second node,
transmitting the configuration content of the measurement gap corresponding to the second node to the second node.

12. The first node according to claim 10, wherein the measurement gap configured by the first node for the UE is a measurement gap corresponding to the first node.

13. The first node according to claim 1, wherein the processor is further configured to execute the network access program so as to implement:
subsequent to acquiring the request information about the measurement gap from the second node,
determining the configuration content of the measurement gap corresponding to each of the first node and the second node in accordance with the request information.

14. The first node according to claim 13, wherein the processor is further configured to execute the network access program so as to implement:
subsequent to determining the configuration content of the measurement gap corresponding to each of the first node and the second node,
transmitting the configuration content of the measurement gap corresponding to each of the first node and the second node to the second node.

15. A second node, wherein a first node and the second node performs Dual connectivity (DC) with User Equipment (UE), and the second node comprises a processor, a memory, and a network access program stored in the memory and executed by the processor, wherein the processor is configured to execute the network access program so as to implement:
receiving a configuration content of a measurement gap from the first node, wherein the measurement gap is configured by the first node for the UE, and comprises at least one of a per-UE measurement gap for the UE, or a per-CC measurement gap for a component carrier corresponding to the UE;
wherein the receiving the configuration content of the measurement gap from the first node comprises:
transmitting request information about the measurement gap corresponding to the second node to the first node; and
acquiring the configuration content of the measurement gap transmitted by the first node in accordance with the request information,
wherein the request information comprises at least one of a configuration request or a configuration policy; wherein the configuration request is a request for configuring the measurement gap;
wherein the configuration content of the measurement gap comprises at least one of a configuration content of the per-UE measurement gap for the UE, or a configuration content of the measurement gap corresponding to the second node;
wherein the configuration content of the measurement gap corresponding to the second node comprises a configuration content of a per-CC measurement gap for a component carrier corresponding to the UE.

16. The second node according to claim 15, wherein the processor is further configured to execute the network access program so as to implement: transmitting the configuration content of the measurement gap to the first node.

17. The second node according to claim 16, wherein the transmitting the configuration content of the measurement gap to the first node comprises:
transmitting the configuration content of the measurement gap to the first node via an X2 interface or an S1 interface for OAM architecture; or
transmitting the configuration content of the measurement gap to the UE so that the UE reports the configuration content of the measurement gap to the first node.

18. The second node according to claim 15, wherein the configuration content of the measurement gap further comprises a configuration content of the measurement gap corresponding to the first node;
wherein the configuration content of the measurement gap corresponding to the first node comprises at least one of a configuration content of a per-CG measurement gap for each cell group corresponding to the UE, or a configuration content of a per-CC measurement gap for a component carrier corresponding to the UE; and
the configuration content of the measurement gap corresponding to the second node further comprises a configuration content of a per-CG measurement gap for each cell group corresponding to the UE.

19. User equipment (UE), comprising a processor, a memory, and a network access program stored in the memory and executed by the processor, wherein the processor is configured to execute the network access program so as to implement:
receiving a measurement gap configured by a first node and/or a second node, wherein the first node and the second node performs Dual connectivity (DC) with the UE; wherein the measurement gap comprises at least one of a per-UE measurement gap for the UE, or a per-CC measurement gap for a component carrier corresponding to the UE;
wherein the processor is further configured to execute the network access program so as to implement:
prior to receiving the measurement gap configured by the first node and/or the second node,
receiving request information about the measurement gap from the second node, and transmitting the request information to the first node; wherein the request information comprises at least one of a configuration request or a configuration policy; wherein the configuration request is a request for configuring the measurement gap;

wherein upon the receipt of the measurement gap from the first node, the processor is further configured to execute the network access program so as to implement: transmitting a configuration content of the measurement gap to the second node; wherein the configuration content of the measurement gap comprises configuration contents of measurement gaps corresponding to the first node and the second node respectively;

wherein the configuration content of the measurement gap corresponding to the second node comprises a configuration content of a per-CC measurement gap for a component carrier corresponding to the UE.

20. The UE according to claim 19, wherein the configuration content of the measurement gap comprises a configuration content of the measurement gap corresponding to the first node;

wherein the configuration content of the measurement gap corresponding to the first node comprises at least one of a configuration content of a per-CG measurement gap for each cell group corresponding to the UE, or a configuration content of a per-CC measurement gap for a component carrier corresponding to the UE;

wherein the configuration content of the measurement gap corresponding to the second node further comprises a configuration content of a per-CG measurement gap for each cell group corresponding to the UE.

* * * * *